(12) United States Patent
Hummer (10) Patent No.: US 6,263,616 B1
(45) Date of Patent: Jul. 24, 2001

(54) MODULAR GRASS TURF TILE SYSTEM AND TRAY

(76) Inventor: J. Robert Hummer, 3705 Nolt Rd., Mount Joy, PA (US) 17552

( * ) Notice: Subject to any disclaimer, the term of this patent is extended or adjusted under 35 U.S.C. 154(b) by 0 days.

(21) Appl. No.: 09/287,912

(22) Filed: Apr. 7, 1999

Related U.S. Application Data (63) Continuation-in-part of application No. 09/183,733, filed on Oct. 30, 1998, now Pat. No. 6,112,680.

(51) Int. Cl.$^7$ .............................. A01G 9/02; A01B 79/00
(52) U.S. Cl. .............................................. 47/65.9; 47/58.1
(58) Field of Search ................................ 47/58.1, 1.01 R, 47/1.01 F, 78, 73, 77, 84, 85, 65.9; 172/19, 20; 108/51.1

(56) References Cited

U.S. PATENT DOCUMENTS

| | | |
|---|---|---|
| Re. 35,006 | 8/1995 | Ripley, Sr. et al. . |
| 3,326,592 | 6/1967 | Pelton . |
| 3,901,324 | 8/1975 | Fisher . |
| 4,236,350 | * 12/1980 | Hasselbach, Sr. . |
| 4,495,725 | * 1/1985 | Talbott ..................................... 47/85 |
| 4,632,192 | 12/1986 | Hooks . |
| 4,658,542 | * 4/1987 | Holmberg ............................. 47/85 X |
| 4,887,388 | * 12/1989 | Waltel, Jr. ............................ 47/85 X |
| 4,941,282 | * 7/1990 | Milstein ................................ 47/58.1 |
| 5,054,831 | 10/1991 | Ting et al. . |
| 5,165,617 | * 11/1992 | van Vuuren ....................... 172/20 X |
| 5,217,078 | 6/1993 | Zinn . |
| 5,309,846 | * 5/1994 | Peterson ............................. 108/51.1 |
| 5,467,555 | 11/1995 | Ripley, Sr. et al. . |
| 5,513,945 | 5/1996 | Hartmann et al. . |
| 5,581,936 | * 12/1996 | Belgiorno .......................... 47/58.1 X |
| 5,595,021 | 1/1997 | Ripley, Sr. et al. . |
| 5,673,513 | * 10/1997 | Casimaty ........................ 148/51.1 X |
| 6,112,680 | * 9/2000 | Hummer ............................. 172/19 X |

FOREIGN PATENT DOCUMENTS

| | | |
|---|---|---|
| 2 766 504 | * 1/1999 | (FR) . |
| 6-62612 | * 3/1994 | (JP) . |

* cited by examiner

Primary Examiner—Peter M. Poon
Assistant Examiner—Son T. Nguyen
(74) Attorney, Agent, or Firm—Volpe & Koenig, PC

(57) ABSTRACT

A combination of a modular tray for use in forming grass turf tiles and a removable grass turf tile formed therein is provided. The combination includes a modular tray having a turf tile support surface and a plurality of parallel ribs formed in the support surface and extending downwardly therefrom. Drainage notches are formed through a lower surface of the nibs. The ribs are asymmetrically spaced with respect to a center line of the support surface such that stacking the modular trays in alternating orientations rotated by 180° results in vertically staggered ribs. Sidewalls extend upwardly from a periphery of the support surface to a generally uniform height above the support surface. Flanges extend from an upper edge of the sidewalls to form a generally planar rim. A drainage material is located on and generally coextensive with the turf tile support surface over the ribs. A mixture of root zone material and fiberous inclusions are located on the drainage layer and has a generally uniform thickness approximately equal to a height of the sidewalls. Grass roots are intertwined with the soil and fibers to form a grass turf tile bounded by the sidewalls, which is removable from the support surface. A method of providing a playing field from modular grass turf tiles is also provided.

13 Claims, 5 Drawing Sheets

MODULAR GRASS TURF TILE SYSTEM AND TRAY

CROSS REFERENCE TO RELATED APPLICATIONS

This application is a continuation-in-part of U.S. application Ser. No. 09/183,733, filed Oct. 30, 1998 now U.S. Pat. No. 6,112,680.

BACKGROUND OF THE INVENTION

The present invention is directed to a modular grass turf tile system, and more particularly, to a system for producing and placing large standardized turf sections to form and maintain a playing surface of an athletic field or any other vegetative surface.

There has been a movement in professional sports, such as football, to use natural turf surfaces, since there is a perception that natural turf surface has more give and lowers the risk of injury to players as well as the severity of injuries encountered in comparison to playing on artificial turf surfaces. This provides additional protection for the players as well as team owners who incur financial losses when players are injured. However, a drawback to natural turf playing surfaces has always been that the playing surface becomes worn through use, and it is not possible to grow or maintain a playing field in top condition over the course of an entire season.

Devices for cutting and picking up strips of sod which are then transferred to a truck or trailer for placement at a new location are known. These devices generally cut long strips of sod which are then rolled up and unrolled at a new location. However, this results in many bumps and joints in the final surface where the sod is placed due to inconsistent depths and multiple handling of the sod. Additionally, the strips may be too small to provide reliable self-anchoring capability during heavy use, and sufficient time must pass for the root system to grow into the existing soil base. While utilizing strips of sod may be acceptable for residential lawns, they may not suitable for athletic fields.

In order to address this problem one known device has been provided for picking up a large area of sod. The device utilizes a plurality of generally vertical teeth which are attached to a frame. A grass area which is to be picked up is undercut and the frame is then lowered onto the grass area such that the generally vertically oriented teeth penetrate the surface. After the teeth have pierced the sod, alternate rows of teeth are pivoted in opposite directions and assume an inclined orientation to secure the sod to the frame. This allows the sod to be harvested from the area where it was grown and placed in a final position. However, because the teeth penetrate the sod generally vertically and are then shifted to an inclined angle, this can cause damage to the sod, affecting its stability. Additionally, after the lifting device is withdrawn, the holes or openings in the sod have a high overhead observable which may be difficult to close in a relatively short time period utilizing conventional equipment, such as rollers. This makes the surface less desirable for use on an athletic field.

Another known device also allows movement of large turf section in order to replace a damaged portion of an athletic field. The device can be used to move a substantially large piece of turf and includes cutting knives mounted along the edges of a frame to sever the replacement turf from a section of ground, as well as a plurality of semicircular tines which are mounted on parallel shafts. The device is positioned over a desired area of turf to be harvested, and the knife blades are then used to cut the turf free. The shafts are then rotated such that the semicircular tines pierce the surface of the turf in order to secure the turf for subsequent lifting. The replacement section is then used as a permanent replacement for a section of damaged turf which is cut and removed from a playing surface. However, in this known device, the semicircular tines pierce the turf generally vertically, again leaving a greater overhead observable opening once the turf has been placed and the apparatus has been removed. Additionally, the configuration of the curved tine can result in the turf being damaged or buckling if the tine does not insert cleanly.

Another known device is used to place a turf product which is located on a pallet temporarily in position in a track surface or on a portion of an athletic field, such as the infield area of a baseball field which is being converted for use as a football field. The turf/pallet combinations are placed in recesses in the surface which are large enough to accommodate the turf and the pallet. However, this can result in a playing surface which may not have a stable feel, since the temporarily positioned turf areas are supported on hollow pallets. Another known system utilizes a similar arrangement of pallet supported turf units which are connected together to form the surface of a playing field. Placement and removal of the turf pallets are accomplished by using a forklift which engages the pallet or by cutting holes down through the turf to the pallet such that generally vertically oriented lifting rods can be connected to the pallet.

It would therefore be desirable to provide a grass turf tile system which allows for the easy placement and replacement of a natural turf surface on an athletic playing field in which the entire playing surface or a substantial portion of the playing surface is formed from replaceable natural grass turf sections that are stable in use, provide instant playability, and which can be easily and quickly maintained. This would provide the benefit of a natural turf playing surface which can be maintained in top condition throughout an entire season by easily replacing or rotating grass turf sections as they become worn.

BRIEF SUMMARY OF THE INVENTION

Briefly stated, the present invention is a method of providing a playing field from modular grass turf tiles. The method includes:

a) providing modular grass turf tiles in trays;

b) removing the grass turf tiles from the trays and placing the grass turf tiles on a selected surface; and c) replacing worn grass turf tiles with one of replacement grass turf tiles from an outside supply or grass turf tiles rotated from a lesser worn area of the playing field.

In another aspect, the present invention provides a combination of a modular tray for use in forming grass turf tiles and a removable grass turf tile formed therein. The combination comprises a modular tray having a turf tile support surface and a plurality of parallel ribs formed in the support surface and extending downwardly therefrom. Drainage notches are formed through a lower surface of the ribs. The ribs are asymmetrically spaced with respect to a center line of the support surface such that stacking the modular trays in alternating orientations rotated by 180° results in staggered ribs. Sidewalls extend upwardly from a periphery of the support surface to a generally uniform height above the support surface. Flanges extend from an upper edge of the sidewalls to form a generally planar rim. A drainage material is located on and generally coextensive with the turf tile support surface over the ribs. A mixture of root zone material and fibrous inclusions are located on the drainage layer and has a uniform thickness approximately equal to a height of the sidewalls. Grass roots are intertwined with the soil and fibers to form a grass turf tile bounded by the sidewalls, which is removable from the support surface.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the modular grass turf tiles and trays and designated parts thereof. The terminology includes the words specifically mentioned above, derivatives thereof and words of similar import. Additionally, in the drawings, like elements have been referenced with like reference numerals throughout. For the sake of clarity, when a single element or feature is shown numerous times in the same drawing view, it may be identified with a reference numeral at each location, or when this would be impractical, the reference numeral is provided only for one or more examples of the element and is marked as "(TYP)" or typical to designate the multiple occurrences of the element.

Figure 5:
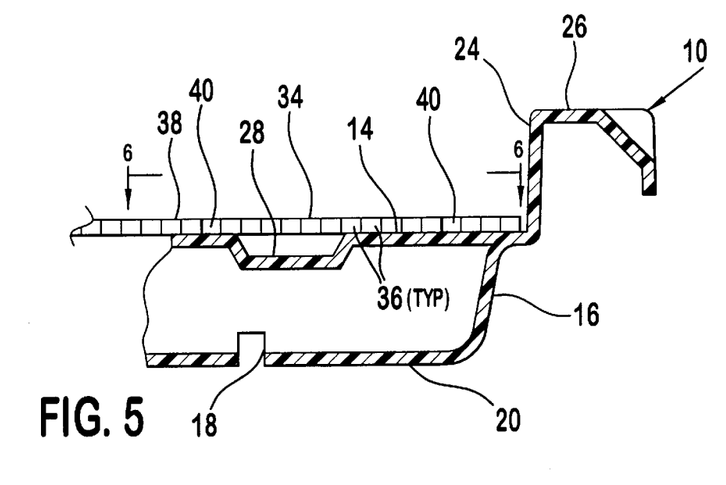
FIG. 5 is a cross-sectional view taken along lines 5—5 in FIG. 1.
Figure 6:
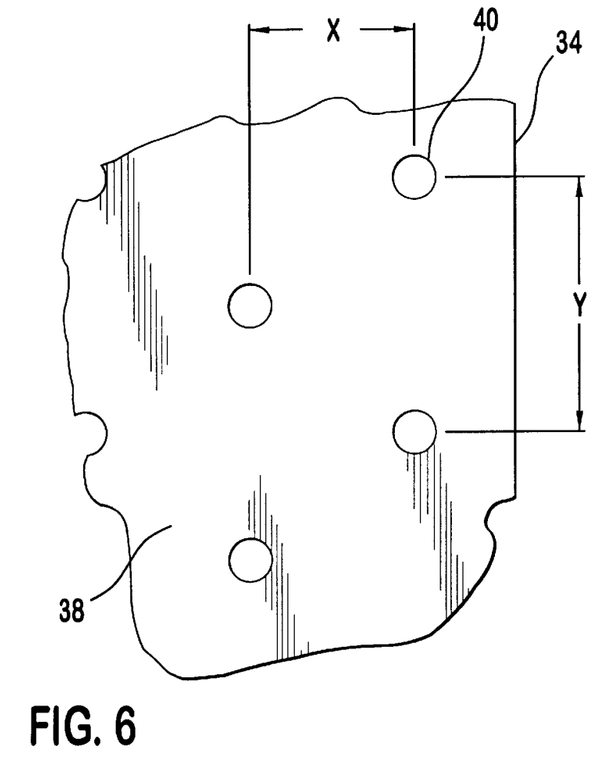
FIG. 6 is a partial plan view of a drainage material located in the tray taken along lines 6—6 in FIG. 5.
Figure 7:
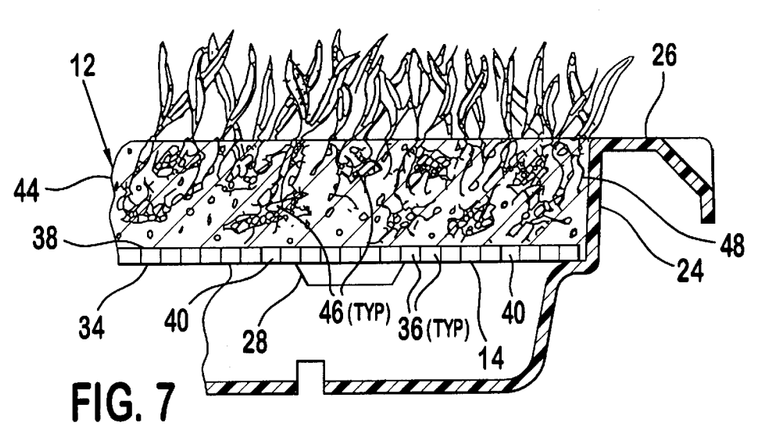
FIG. 7 is a cross-sectional view similar to FIG. 5 showing the combination of a grass turf tile located in the modular tray.

Referring to FIGS. 1–7, a modular tray 10 for use in forming grass turf tiles in combination with a removable grass turf tile 12 shown in FIG. 7 formed therein is provided. As shown in detail in FIGS. 1–5 and 7, the tray 10 has a turf tile support surface 14. A plurality of parallel ribs 16 are formed in the support surface 14 and extend downwardly therefrom. Preferably, the first and last ribs 16 are segmented as shown. As shown in detail in FIGS. 1 and 5, drainage notches 18 are formed through a lower surface 20 of the ribs 16.

Figures 1, 2:
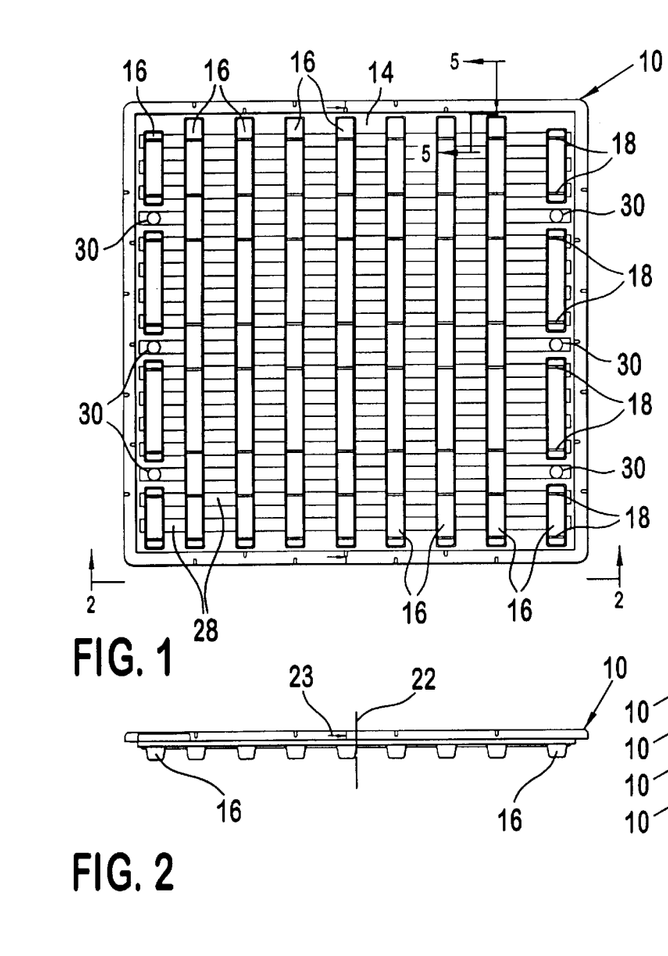
FIG. 1 is a plan view of a modular grass turf tile tray in accordance with the present invention.
FIG. 2 is a front elevational view taken along lines 2—2 in FIG. 1.
Figure 3:
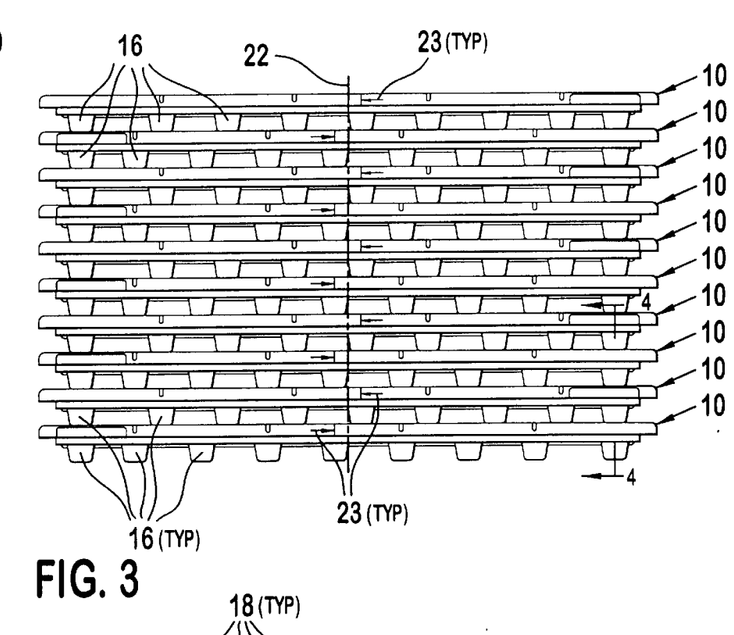
FIG. 3 is a front elevational view, similar to FIG. 2 showing a stack of modular grass turf tile trays with alternating tray orientations.
Figure 4:
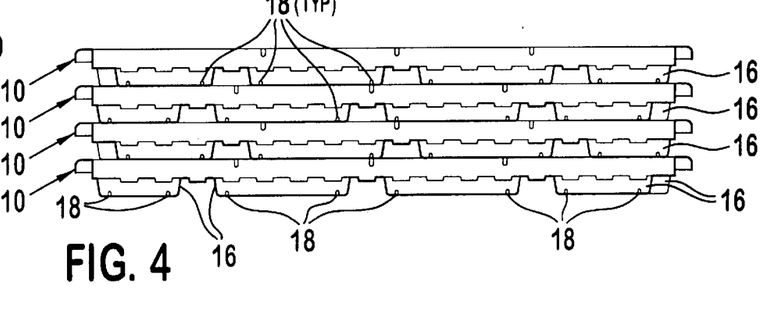
FIG. 4 is a cross-sectional view taken along lines 4—4 in FIG. 3.

As shown in detail in FIGS. 2 and 3, the ribs 16 are asymmetrically spaced with respect to a center line 22 of the support surface such that stacking modular trays in alternating orientations rotated by 180°, as indicated by arrows 23 shown in FIG. 3, results in vertical rows of staggered ribs 16. This provides adequate support for the support surface 14 while preventing in-line compression of the grass turf tiles at the rib locations when the grass turf tiles 12 are stacked in the trays 10 for transport. As shown in detail in FIG. 5, sidewalls 24 extend upwardly around a periphery of the support surface 14 to a generally uniform height above the support surface 14. In the preferred embodiment, the sidewalls 24 extend approximately 2.5 inches above the support surface 14, which provides a sufficient depth for the soil mixture and turf grass roots to grow in order to form a stabilized matrix for the grass turf tile 12. However, the sidewall height could be varied, if desired. Flanges 26 extend from an upper edge of the sidewalls 24 to form a generally planar rim.

As best shown in FIGS. 1, 4, 5 and 7, preferably a plurality of longitudinal stiffening channels 28 are formed in the support surface 14 generally perpendicular to the ribs 16.

In the preferred embodiment, the modular tray 10 is vacuum formed from HMW-HDPE from Phillips HXM50100, low sag, black, with a starting gauge of 0.250 inches to 0.375 inches. After vacuum forming, the drainage notches 18 are cut through the ribs 16 in eight cutting passes. Preferably, drainage holes 30 are located between the segments of the first and last ribs 16, as shown in FIG. 1. However, it will be recognized by those skilled in the art from the present disclosure that the modular try may be vacuum formed as one piece from other types of polymeric material, if desired. In the preferred embodiment, the modular tray 10 is approximately 90 inches square and the sidewalls 24 define a square opening approximately 85 inches square. The height of the ribs which extend downwardly from the support surface 14 is preferably about 2.7 inches. However, it will be recognized by those skilled in the art from the present disclosure that other standardized sizes could be utilized for forming modular grass turf tiles 12 in accordance with the present invention. While in the preferred embodiment vacuum forming is utilized, other methods of forming the modular tray 10 may also be utilized, such as injection molding or casting utilizing other types of polymeric material.

As shown in FIGS. 5 and 6, preferably a drainage material 34 is located on and generally coextensive with the turf tile support surface 14 over the ribs 16. In a preferred embodiment, the drainage material 34 is provided as a sheet and includes a plurality of enclosed parallel channels 36 defined therethrough which extend in a plane generally parallel to a surface 38 of the drainage material 34. A plurality of perforations 40 are defined through the surface 38 of the drainage material 34 and are in communication with the channels 36. However, it will be recognized that other suitable drainage materials may be utilized, if desired.

In the preferred embodiment, the drainage material 34 is formed of a polymeric material such as polypropylene and the channels 36 are defined by a plurality of inner walls located between the two outer layers. However, it will be recognized by those skilled in the art that other suitable polymeric materials may be used. In the preferred embodiment, the drainage material 34 is approximately may be 5 mm to 10 mm in height with the internal channel forming walls being spaced apart sufficiently to define the channels 36, while still providing structural integrity. In the preferred embodiment the internal walls are spaced apart approximately the same distance as the height of the drainage material 34, providing channels 36 having approximately square dimensions, and the material thickness is preferably 0.5 to 1.0 mm. The holes 40 are preferably punched through the drainage material 34 in staggered rows spaced apart by a distance "X", with the holes in each row being spaced apart by a distance "Y". In the preferred embodiment X is approximately 1.5–2.0 cm, Y is approximately 3.5–4.0 cm, and the holes 40 have a diameter of approximately 5–7 mm. However, it will be recognized by those skilled in the art from the present disclosure that the size and spacing of the holes 40 can be varied to achieve a desired drainage.

As shown in detail in FIG. 7, a mixture of root zone material 44 and fibrous inclusions 46 are located on the drainage material and have a general uniform thickness of approximately equal to a height of the sidewalls 24. Plant roots 48, such as from grass, are intertwined with the root zone material 44 and fibrous inclusions 46 to form a coherent matrix which forms the base of a grass turf tile bounded by the sidewalls 24, which is removable from the support surface 14. While the grass turf tile 12 has been described in terms of turf used in connection with a playing surface, it will be understood by those skilled in the art from the present disclosure that the grass turf tiles 12 can be used in conjunction with any section of turf, which may include grass or other types of vegetative material, such as beach grass or vegetation for erosion control. Additionally, the grass turf tiles 12 may be used in any other suitable application, such as golf courses, horse arenas, landfills, or for any desired ground cover.

It will also be recognized by those skilled in the art from the present disclosure that the root zone material 44 may be composed of a mixture of sand and/or compost or any other material in which grass or sod is grown. Other soil conditioners may also be added to the soil, such as diatomaceous earth or fertilizer. With respect to the fibrous inclusions in the preferred embodiment, recycled carpet pieces are utilized which have been shredded into small pieces consisting mainly of face yarns with bits or pieces of backing attached to the face yarns. One preferable soil mixture for use with the present invention is described in U.S. patent application Ser. No. 08/788,480 which was filed on Jan. 28, 1997, and is incorporated herein by reference as if fully set forth. However, it will be recognized by those skilled in the art from the present disclosure that synthetic fibers or other small pieces of material may be utilized.

Figure 8:
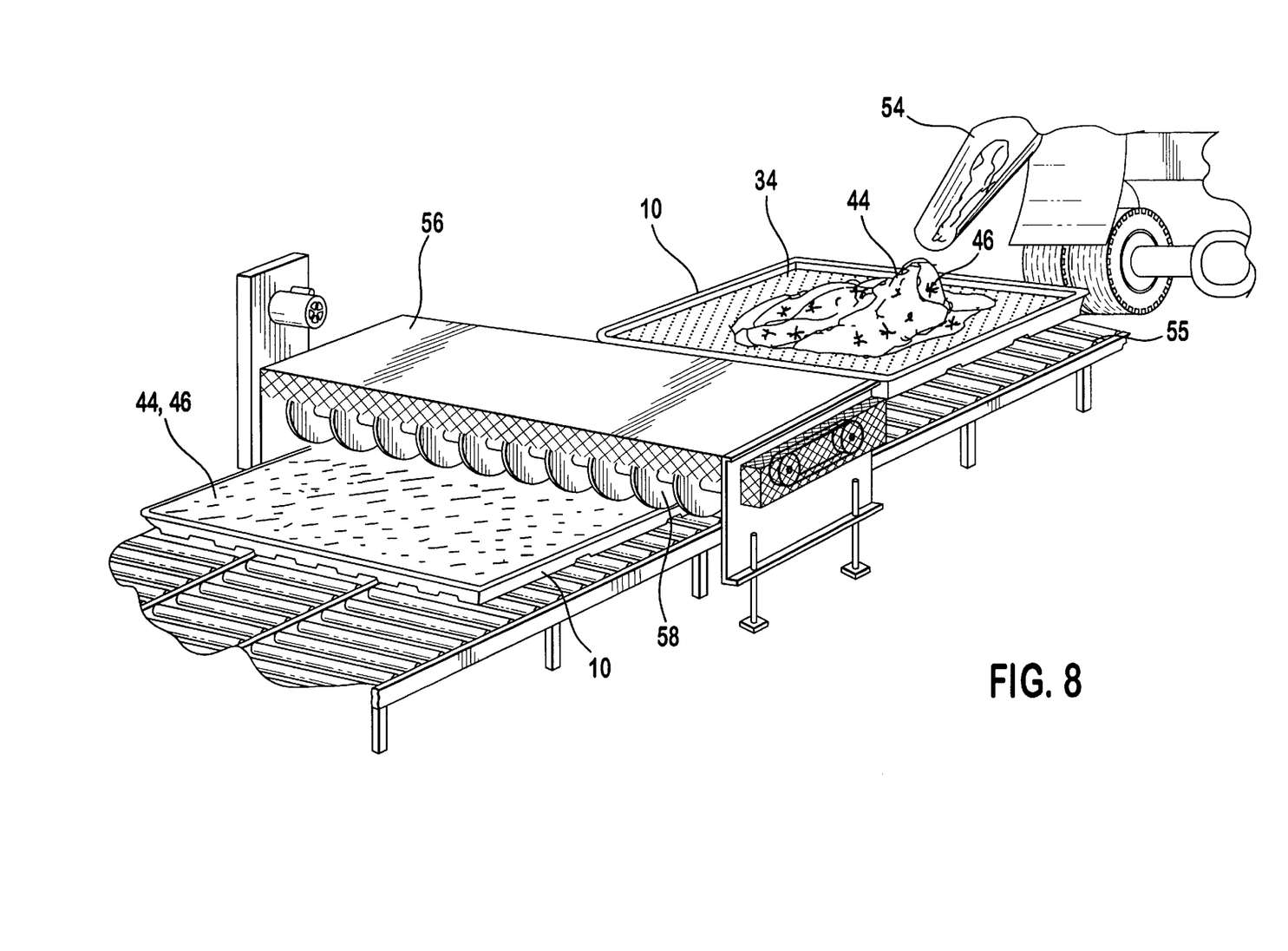
FIG. 8 is a perspective view showing the initial steps in forming of a grass turf tile in a modular tray.
Figure 10:
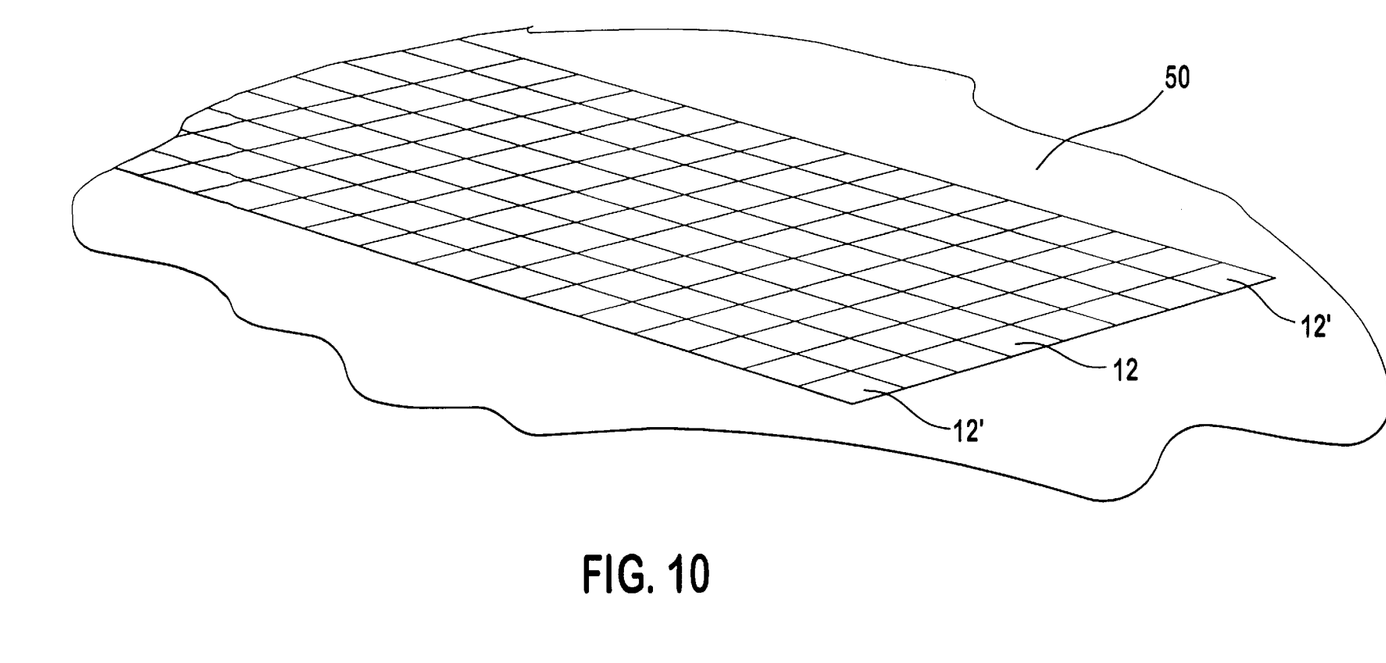
FIG. 10 is a schematic view of a playing field in accordance with the present invention illustrating the use of a plurality of modular grass turf tiles.

By utilizing the modular tray 10 with a removable grass turf tile 12 formed therein, the present invention is preferably used for creating a playing field 50, or a portion thereof shown schematically in FIG. 10, from the modular grass turf tiles 12. In order to form a playing field or other turf surface, the modular grass turf tiles 12 are provided in the trays 10. The turf tiles 12 are formed by initially placing a layer of the drainage material 34 in the tray 10 on the support surface 14 as shown in FIG. 8. The drainage channels 36 in the drainage material 34 are oriented in one direction in all of the trays 10. Each tray 10 is then filled with a mixture of root zone material 44 and fibrous inclusions 46 to a uniform depth as shown in detail in FIG. 8. Preferably, this is done utilizing a soil mixer 54, such as a rotary mixer in which the root zone material 44 and fibrous inclusions 46 are placed with any additional soil amendments desired. One such mixer is a Doyle ten-ton mixer. The root zone material and fiber mire 44, 46 is dumped onto the drainage material 34 on the support surface 14 of a tray 10, which is preferably supported on a roller conveyer 55. Other equipment for mixing the root zone material 44 and fibrous inclusions 46 may be utilized, and the root zone material mix may be spread on the tray 10 by other means. The soil mixture 44, 46 is leveled, preferably using an auger type leveling device 56 having at least one rotatable auger 58, as shown in FIG. 8, which levels the soil 44, 46 evenly across the width of the tray 10, removing any excess. The leveled soil mixture 44, 46 is then preferably tamped in the tray utilizing a vibratory plate or plates. The mixture in the tray 10 is then seeded, sprigged or planted with the desired grass, such as washed bluegrass sod for cool season applications or sprigs of Bermuda grass for warm season climates. The surface is then preferably rolled and water and chemicals, such as fertilizer are applied. The desired grass is then allowed to grow in the soil mixture 44, 46, as shown in FIG. 7, with the root structure interlocking with the soil and fibers to produce a stabilized modular grass turf tile 12.

Figure 9:
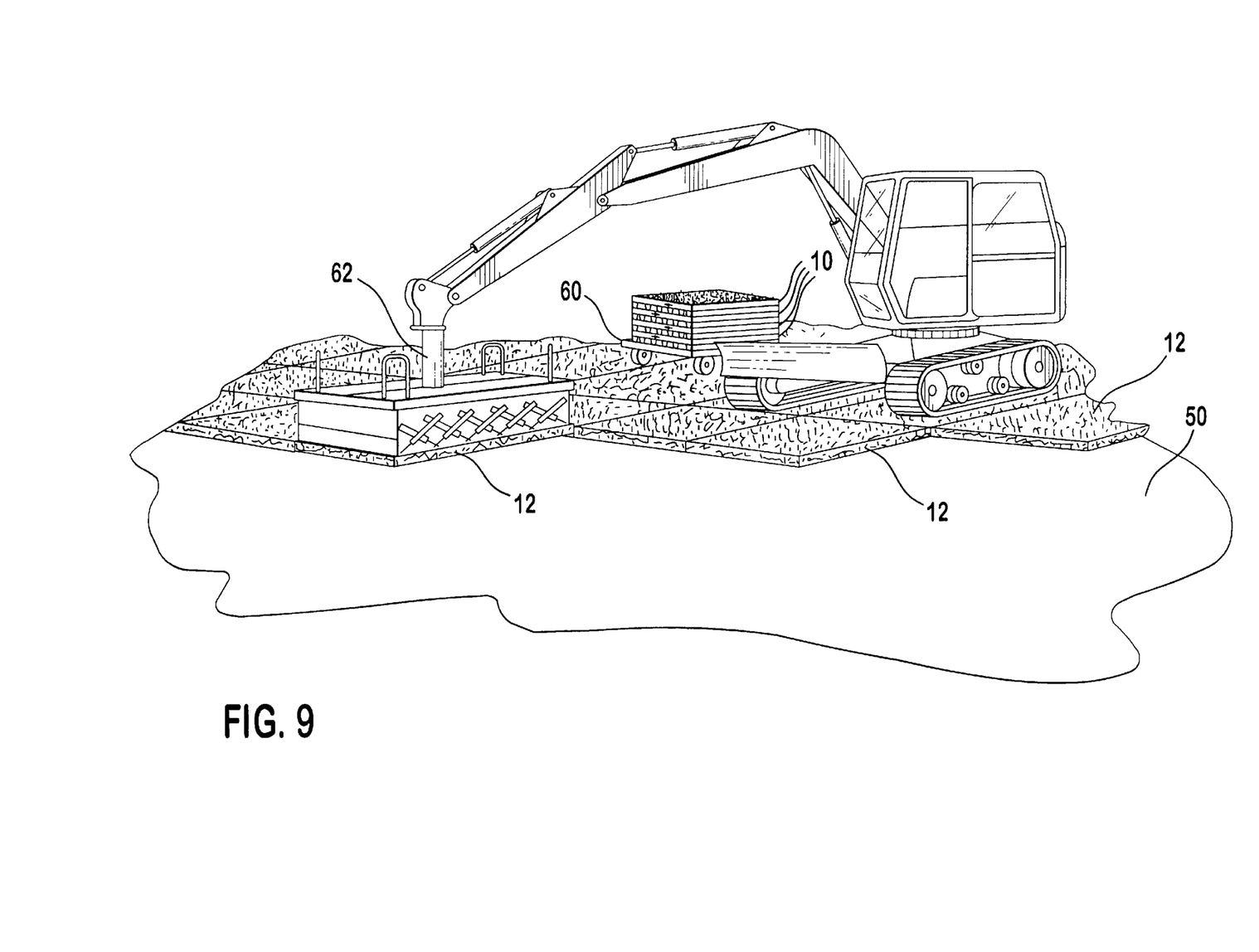
FIG. 9 is a perspective view illustrating the placement of grass turf tile which has been removed from a modular tray in order to provide a playing field.

For use, modular trays 10 with the stabilized modular grass tile tiles 12 are stacked on a transport device 60, shown in FIG. 9, which is preferably in the form of a wagon for transport to the playing field 50. Alternate trays 10 with the asymmetrically located stacking feet formed by the ribs 16 are stacked in opposite orientations such that the asymmetrically located stacking feet provided by the ribs 16 of adjacent trays 10 in the stack are not aligned, as shown in FIGS. 3 and 9. As illustrated in FIG. 9, preferably the grass turf tiles 12 are removed from the trays 10, preferably utilizing an apparatus 62 such as that disclosed in Applicant's prior U.S. patent application Ser. No. 09/183,733, filed Oct. 30, 1998, which is incorporated herein by reference as if fully set forth, and placed on a selected surface to form the playing field 50. The grass turf tiles 12 may be removed from the modular trays 10 with the drainage material attached and can be placed on the selected surface, such as a stable base for the playing field 50, with the drainage channels 36 aligned in one direction. Based on the perforations or holes 40 provided through the drainage material 34 in communication with the drainage channels 36, water can easily drain from the grass turf tiles 12 through the drainage channels 36. In the preferred embodiment, the drainage channels 36 are oriented perpendicular to the crown provided in the center of the playing field for drainage. This allows increased water and air movement through the grass turf tiles 12 due to the drainage channels 36 in communication with the holes or perforations 40, if desired. Alternatively, the grass turf tiles 12 may be placed on the desired surface without the drainage material 34.

In order to prevent cross turf tile 12 root interlocking, separator material may also be placed between adjacent grass turf tiles 12 as they are installed on the selected surface. This allows for easier and faster rotation of the grass turf tiles 12. Once the grass turf tiles 12 are installed, the playing field or surface may be rolled to close the seams between adjacent grass turf tiles 12. However, this is not necessarily required if the tiles 12 are placed closely together using the lifting device disclosed in U.S. application Ser. No. 09/183,733, filed Oct. 30, 1998, which is incorporated herein by reference as if fully set forth. Worn grass turf tiles 12, which become worn through use of the playing field 50 or other playing surface, are placed with one of replacement grass turf tiles 12 from an outside supply or grass turf tiles, such as 12' in FIG. 10, which is rotated from a low wear area of the playing field 50. In order to replace a worn grass turf tile 12 with a grass turf tile 12' from a low wear area of the playing field, the worn grass turf tile 12 is lifted from the surface of the playing field 50, leaving a turf tile opening and the worn grass turf tile 12 is placed in a standby position. A grass turf tile 12' is lifted from a low wear area of the playing field 50 and is placed in the tile opening created by movement of the worn grass turf tile 12. This leaves a second turf tile opening in the low wear area, and the worn grass turf tile 12 is lifted from the standby position and placed in the second turf tile opening.

For replacement of a worn grass turf tile 12 from an outside supply, the worn grass turf tile 12 is lifted from the surface of the playing field 50 leaving a turf tile opening. A replacement grass turf tile 12 from an outside supply is then placed in the turf tile opening in the same manner as during initial placement. The worn grass turf tile 12 can then be placed in a staging area for rehabilitation, and preferably a number of spare grass turf files 12 are maintained in the staging area so that a number of grass turf tiles 12 are available for replacement at any give time. Preferably, grass turf tiles which have been replaced are rolled prior to use.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of providing a vegetative surface from modular grass turf tiles comprising:
    providing modular grass turf tiles in trays comprising:
        providing a modular tray;
        placing a layer of drainage material in the tray;
        filing the tray with a mixture of soil and fibers to a uniform depth;
        leveling and finning the mixture of soil;
        one of seeding, sprigging, soilless sodding, plugging or planting the mixture of soil in the tray with a desired grass; and
        allowing the desired grass to grow into the soil mixture to produce a stabilized modular grass turf tile;
    removing the grass turf tiles from the trays and placing the grass turf tiles on a selected surface; and
    replacing individual worn grass turf tiles with one of replacement grass turf tiles from an outside supply or grass turf tiles rotated from a lesser worn area of the selected surface.

2. The method of claim 1 further comprising:
    providing the modular tray with asymmetrically located stacking feet having a plurality of drainage channels located in the stacking feet;
    stacking the modular trays with the stabilized modular grass turf tile on a transport device for transport to a desired end location, with alternate trays being oriented in opposite directions such that the asymmetrically located stacking feet of adjacent trays in a stack are not aligned.

3. The method of claim 1 further comprising:
    providing the drainage material with drainage channels located in a plane generally parallel to a surface of the drainage material which are oriented in one direction;
    removing the grass turf tiles from the modular trays with the drainage material attached; and
    aligning the drainage channels in one direction during placing of the grass turf tiles on the selected surface.

4. The method of claim 3 further comprising:
    providing perforations through the drainage material in communication with the drainage channels; and
    draining water from the grass turf tiles through the drainage channels.

5. The method of claim 3 further comprising:
    increasing air movement through the grass turf tiles through the use of the drainage channels.

6. The method of claim 1 wherein the step of replacing worn grass turf tiles with one of replacement grass turf tiles from the outside supply or grass turf tiles rotated from the lesser worn area of the selected surface further comprises:
    lifting a worn grass turf tile from the selected surface leaving a tile opening and placing the worn grass turf tile in a standby position; lifting a grass turf tile from the low wear area of the selected surface and placing the grass turf tile from the low wear area in the tile opening created by movement of the worn grass turf tile, leaving a second tile opening; and lifting the worn grass turf tile from the standby position and placing the worn grass turf tile in the second tile opening.

7. The method of claim 1 wherein the step of replacing worn grass turf tiles with one of replacement grass turf tiles from the outside supply or grass turf tiles rotated from the low wear area of the selected surface further comprises: lifting a worn grass turf tile from the selected surface leaving a tile opening and placing a replacement grass turf tile from an outside supply in the tile opening.

8. A method of providing a vegetative surface from modular grass turf tiles, comprising:
    providing modular grass turf tiles in trays;
    removing the grass turf tiles from the trays and placing the grass turf tiles on a selected surface; and
    replacing individual worn grass turf tiles with one of replacement grass turf tiles from an outside supply or grass turf tiles rotated from a lesser worn area of the selected surface; and
    placing a separator between edges of adjacent grass turf tiles as they are installed on the selected surface to prevent cross tile root interlocking to allow for easier placement or rotation.

9. In combination, a modular tray for use in forming grass turf tiles and a removable grass turf tile formed therein, comprising:
    a modular tray having a turf tile support surface, a plurality of parallel ribs formed in the support surface and extending downwardly therefrom, drainage notches formed through a lower surface of the ribs, the ribs being asymmetrically spaced with respect to a centerline of the support surface such that stacking modular trays in alternating orientations rotated by 180° results in vertically staggered ribs, sidewalls extending upwardly from a periphery of the support surface to a generally uniform height above the support surface, flanges extending from an upper edge of the sidewalls to form a generally planar rim;
    drainage material located on and generally coextensive with the turf tile support surface over ribs; and
    a mixture of root zone mix and fibrous material being located on the drainage material and having a generally uniform thickness approximately equal to a height of the sidewalls, grass roots being intertwined with the soil and fibers to form a grass turf tile bounded by the sidewalls, which is removable from the support surface.

10. The combination of claim 9 wherein the drainage material includes a plurality of enclosed, parallel channels defined therethrough which extend in a plane parallel to a surface of the drainage material, and a plurality of perforations are defined through the surface of the drainage material in communication with the channels.

11. The combination of claim 9 wherein a plurality of longitudinal stiffening channels are formed in the support surface generally perpendicular to the ribs.

12. The combination of claim 9 wherein the modular tray is vacuum formed as one piece from a polymeric material.

13. The combination of claim 9 wherein the modular tray is approximately 90 inches square and the sidewalls define a square opening approximately 85 inches square.

* * * * *

UNITED STATES PATENT AND TRADEMARK OFFICE
CERTIFICATE OF CORRECTION

PATENT NO. : 6,263,616 B1
DATED : July 24, 2001
INVENTOR(S) : J. Robert Hummer

It is certified that error appears in the above-identified patent and that said Letters Patent is hereby corrected as shown below:

<u>Column 7, claim 1,</u>
Line 41, after the word "and", delete "finning" and insert therefor -- firming --.

Signed and Sealed this

Twelfth Day of March, 2002

Attest:

JAMES E. ROGAN
*Director of the United States Patent and Trademark Office*

*Attesting Officer*